United States Patent [19]

Wilson

[11] 4,290,321

[45] Sep. 22, 1981

[54] VARIABLE LOCK DIFFERENTIAL

[76] Inventor: Denney R. Wilson, Rte. 4, Ossian, Ind. 46777

[21] Appl. No.: 51,626

[22] Filed: Jun. 25, 1979

[51] Int. Cl.³ .............................................. F16H 1/44
[52] U.S. Cl. .................................... 74/711; 74/710.5; 192/93 A
[58] Field of Search ...................... 74/710.5, 710, 711; 192/93 A, 56, 54

[56] References Cited

U.S. PATENT DOCUMENTS

| | | | |
|---|---|---|---|
| 2,855,805 | 10/1958 | Fallon | 74/711 |
| 3,580,108 | 5/1971 | Mieras | 74/711 |
| 3,886,813 | 6/1975 | Baremor | 74/710.5 |
| 4,059,026 | 11/1977 | Stritzel | 74/711 |

FOREIGN PATENT DOCUMENTS 996163  6/1965  United Kingdom .................. 74/711

Primary Examiner—C. J. Husar
Assistant Examiner—Mark A. Daugherty
Attorney, Agent, or Firm—Frank B. McDonald

[57] ABSTRACT

A limited slip differential includes a mechanism for producing a varied bias ratio as a result of changes in side gear torque. An annular drive flange is biased toward frictional locking means within the differential case to provide biasing as required. The flange contains a first cam surface mateable with a second cam surface disposed on the back face of one of the side gears. Either the first or second cam includes a variable pressure angle, whereby a varied biasing force is developed on the drive flange as the side gear moves relative to the flange via changes in side gear toque.

6 Claims, 9 Drawing Figures

VARIABLE LOCK DIFFERENTIAL

BACKGROUND

This invention relates to improvements in operability of differentials, and particularly to improvements in limited slip differentials, wherein a substantial driving torque may be provided to both driving wheels of a road vehicle, regardless of loss of traction by one of the wheels.

Limited slip differentials having means for limiting or preventing normal differential action are well known. For example, U.S. Pat. No. 2,855,805 illustrates and describes a face coupling assembly for transmitting torque between one of the side gears of a differential and its associated axle shaft. The face coupling functions to move working components of the differential unit to positions which resist normal differential action. Axial thrust is developed via the use of positive pressure angles on mating surfaces of the face coupling and the side gear, whereby imbalances in driving torque in the side gears result in the biasing of the face coupling against conventional locking means. There is, however, no means within the conventional limited slip differential for varying the bias ratio of the unit which could be, for example, provided by the use of non-constant pressure angles in the mating surfaces of either the side gear or face coupling, respectively. As the bias ratio represents the ratio of non-slipping wheel torque to slipping wheel torque, a variable bias ratio is seen as desirable in a multitude of applications, ranging from off-road equipment to various two and four wheel drive highway vehicles.

DISCLOSURE OF THE INVENTION

The invention disclosed and claimed herein provides a means for varying the bias ratio of a limited slip differential. A preferred embodiment of the invention includes a drive flange positioned intermediate the back face of one of the differential side gears and the limited slip locking means. The flange is rotatable in coaxial relation with the side gear. The back face of the side gear and the drive flange contain mating cam surfaces, and as the side gear torque changes, the gear is rotated relative to the flange, thus camming the flange away from the side gear and against the locking means. A variable pressure angle is contained in one of the aforesaid cam surfaces whereby a varied bias ratio is achieved as drive torque is varied on the side gear.

DETAILED DESCRIPTION OF THE PREFERRED EMBODIMENT

Figure 1:
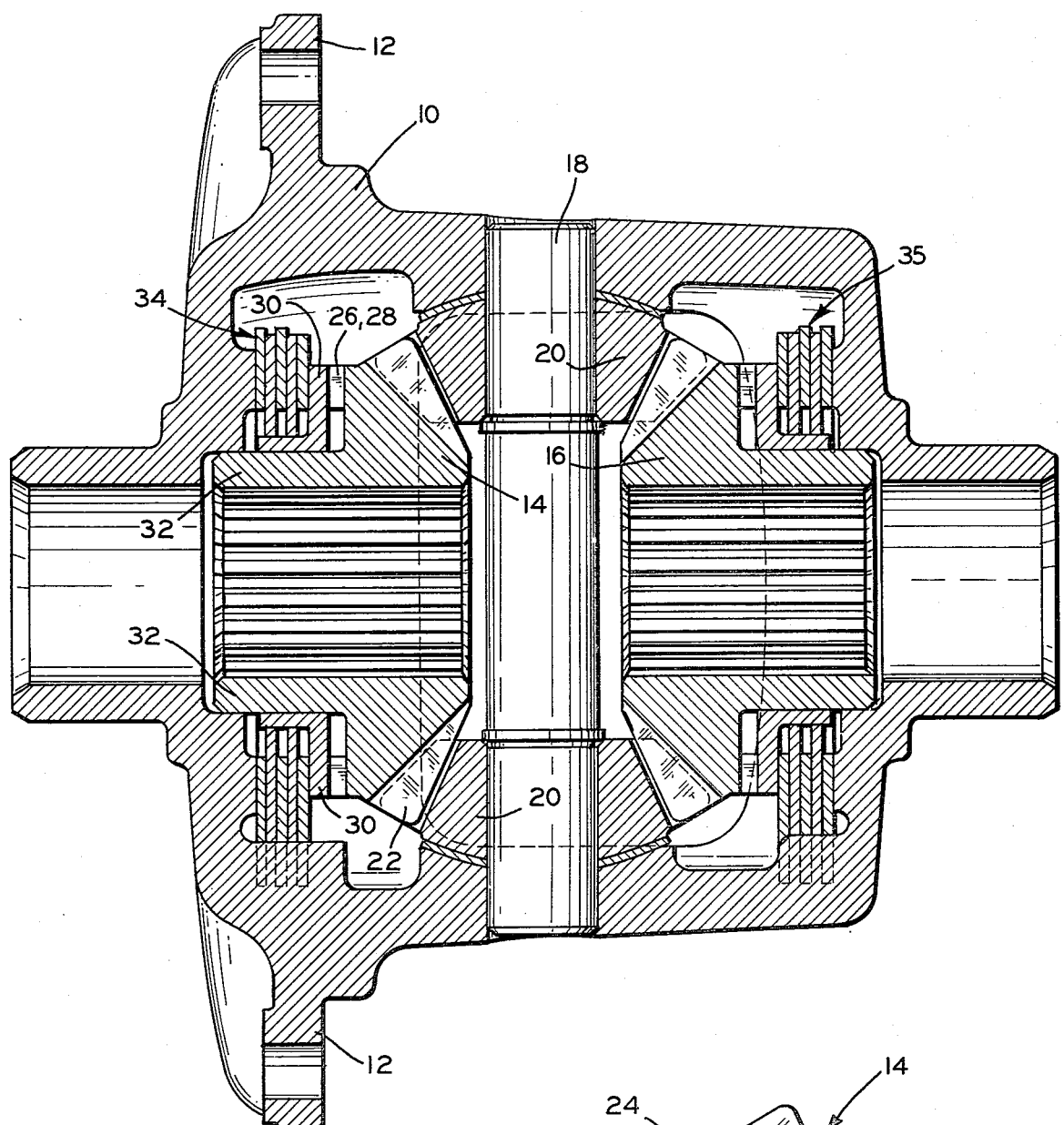
FIG. 1 is a cross-section view of a differential which incorporates the present invention.

FIG. 1 depicts a preferred embodiment of the differential assembly of the present invention. Differential case 10 includes a mounting flange 12 for a ring gear, not shown. The ring gear is adapted to mesh with a suitable drive pinion for providing drive torque to the differential assembly mechanism in a conventional manner. The differential case 10 is mounted for rotation within a housing, and carries torque from a drive train through side gears 14 and 16 to axle shafts (not shown) integrally splined through the latter gears. A pinion shaft 18 is fixed to the case 10, and thus rotates therewith. The pinion gears 20 rotate on shaft 18 and mesh with the side gears 14 and 16 to drive the aforementioned axle shafts.

Figure 2:
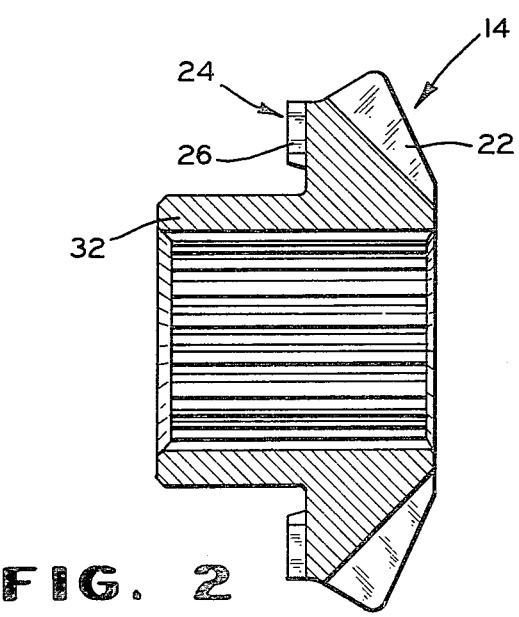
FIG. 2 is a cross-section view of the left-hand side gear of FIG. 1.
Figure 3A:
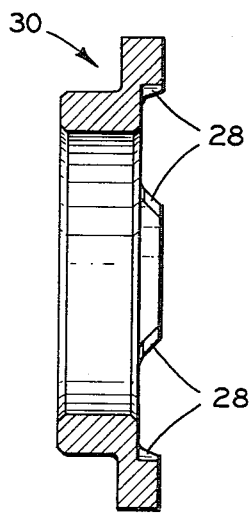
FIG. 3A is a cross-section view of the left-hand drive flange which mates with the left-hand side gear in FIG. 1.
Figure 3B:
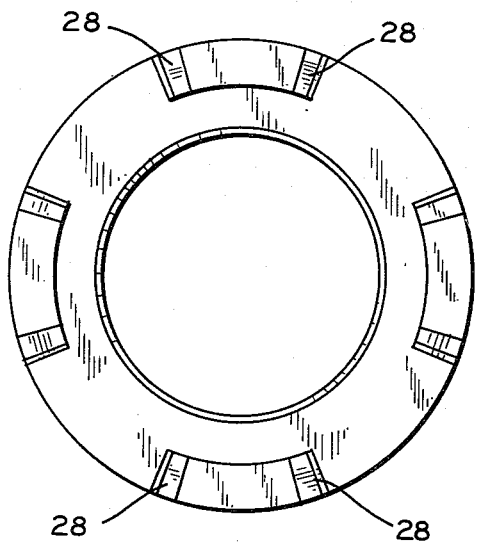
FIG. 3B is a face view of same flange.

FIG. 2 is a cross-section view of the left hand side gear 14. The side gear has a beveled forward facing surface 22 which remains in constant mesh with pinion gear 20. Side gear 14 also has a back face portion 24 which contains an integral cam surface 26. The latter surface 26 mates with another cam surface 28 which is on a drive flange 30, shown more clearly in FIGS. 3A and 3B. As apparent from FIG. 1, the drive flange 30 is annularly supported on a hub 32 of the side gear 14, and is not splined thereto, but is free to rotate and move axially thereon. The drive flange 30 lies intermediate a friction clutch pack 34 and the back face 24 of the side gear 14. Thus, it will be seen that side gear separation forces will activate the limited slip feature by camming the drive flange 30 against the friction clutch pack 34, a conventional mechanism for biasing differential locking means as result of torque imbalances in side gears. In the preferred embodiment, the clutch pack 34 contains spring means as per conventional limited slip practice, for example, a dished plate spring 35 shown loaded (hence, flattened) in FIG. 1.

In the mechanism of the present invention, however, the side gear and drive flange cam surfaces 26 and 28 respectively, produce a varied bias ratio as imbalances in drive torque in side gears occur. As mentioned previously, one of the cam surfaces contains a varying pressure angle. In the preferred embodiment as described herein, the cam surface 28 in the drive flange 30 contains the variable pressure angle, now to be more particularly described.

Figure 4A:
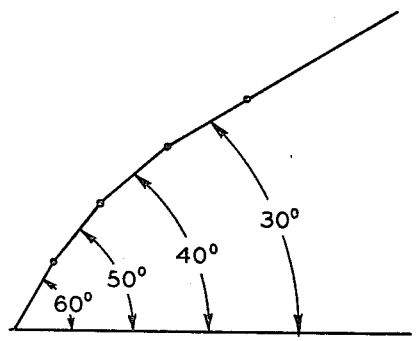
FIGS. 4A and 5A depict examples of drive flange cam surface profiles.
Figure 5A:
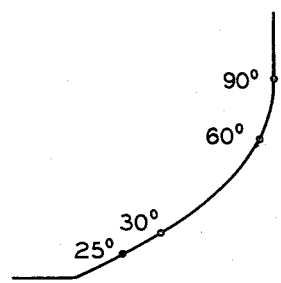
Figure 6:
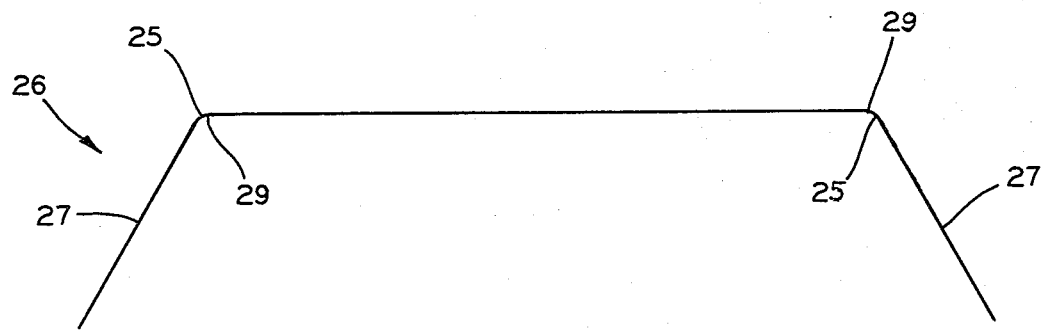
FIG. 6 is a profile of the side gear cam.

FIGS. 4A and 5A depict two examples of profiles called "vari-gear profiles" of the operating portion of the cam surface 28 of drive flange 30. The prior art cams have generally employed surface-to-surface sliding contact, since the mating surfaces have complementary pressure angles. In contrast, the cams of the present invention employ a line-to-line sliding contact, wherein the contact line moves along a curvilinear path as, for example, in a path tangent to the profiles depicted in FIGS. 4A and 5A. FIG. 6 shows the profile of the side gear cam surface 26. The cam 26 has a constant angle profile with a contact point 25 fixed at the intersection of the pressure angle 27 and the top land 29. In the preferred embodiment it is in fact the contact point 25 which slides along the cam surface 28 of drive flange 30 in a path thereover described herein as a vari-gear profile. In addition to those of FIGS. 4A and 5A, other curvilinear profiles may be employed which fall within the scope of this invention as, for example, those containing two or more linear, or constant angle, portions.

Figure 4B:
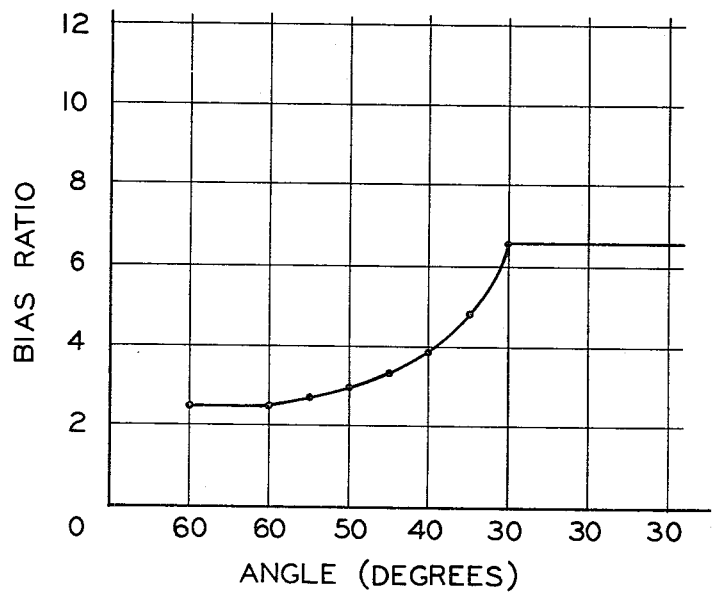
FIGS. 4B and 5B depict graphs of bias ratio values achieved during contact between a side gear constant pressure angle cam surface and the variable pressure angle profile of the drive flange cam surfaces of FIGS. 4A and 5A, respectively.
Figure 5B:
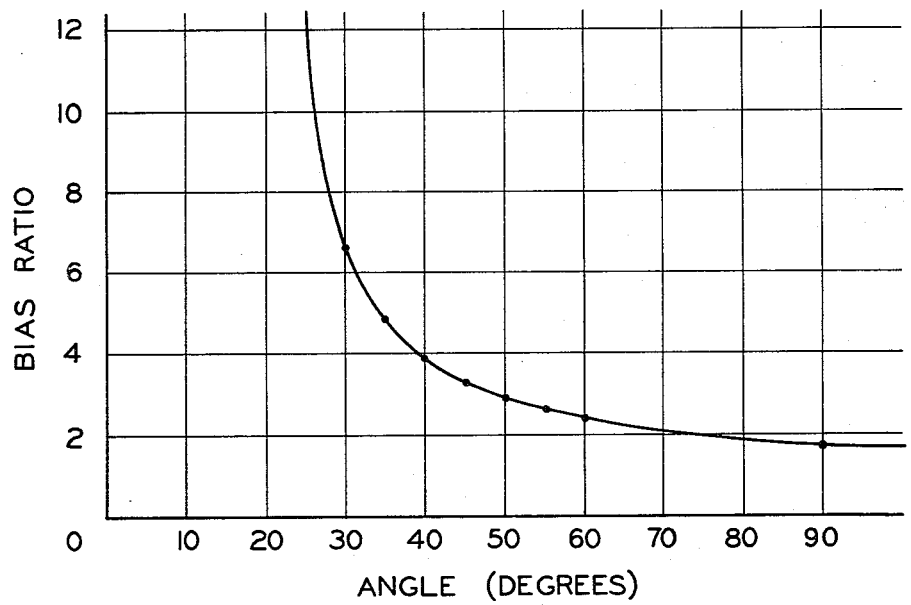

FIGS. 4B and 5B are graphs showing how the bias ratio would vary along the vari-gear profiles in FIGS. 4A and 5A, respectively. As becomes apparent from these examples, the use of a variable pressure angle in one of the mating cam surfaces provides for considerable flexibility with respect to differential bias ratios.

As an example of means for employing the concept of the present invention, the cam surfaces may be defined by the mating faces of curvic clutch teeth, wherein one of the mating faces is curvilinear, and thus contains a variable pressure angle profile. In addition, it may be noted that although FIG. 1 shows employment of a drive flange and locking means on both sides of a differential, the Figure is by way of example only, as the invention may be successfully employed on only one side thereof.

What is claimed is:

1. In a differential including limited slip locking means and a pair of side gears one of said side gears including a back face having a cam surface, said differential further including an annular drive flange rotatable in coaxial relationship with said side gear, said flange having a cam surface thereon mateable with the cam surface of said side gear, said flange being positioned intermediate said locking means and said side gear such that as said gear is rotated relative to said flange, said side gear cams said flange against said locking means, an improvement comprising a variable pressure angle comprising a curvilinear profile in one of said cam surfaces whereby a varied bias ratio is achieved as drive torque is varied on said side gear.

2. The differential of claim 1 wherein said drive flange contains said cam surface defined by said curvilinear profile.

3. The differential of claim 2 wherein the cam surface on said back face of said side gear is defined by a contact area at the intersection of a cam pressure angle and top land, whereby said contact area moves slidingly over said curvilinear profile in a path tangent to said profile.

4. The differential of claim 3 wherein said curvilinear profile contains two or more linear portions.

5. The differential of claim 4 wherein said cam surfaces are incorporated in mating curvic clutch teeth on said side gear and drive flange, respectively.

6. The differential of claim 1 wherein said curvilinear profile contains one or more linear portions.

* * * * *